Patented Dec. 5, 1950

2,532,498

UNITED STATES PATENT OFFICE 2,532,498

POLYMERIZABLE POLYESTERS

Harold A. Hoppens, Toledo, Ohio, assignor to Libbey-Owens-Ford Glass Company, Toledo, Ohio, a corporation of Ohio No Drawing. Application June 22, 1948,
Serial No. 34,551

8 Claims. (Cl. 260—75)

1

The invention relates to polymerizable polyesters of improved stability that have high compressive strength upon polymerization.

A polymerizable unsaturated polyester is highly advantageous as a starting material for the production of hardened synthetic resins in that it is resinous in character before polymerization, and is fusible at a temperature at which polymerization is not rapid. Other heat hardenable compositions, such as urea-formaldehyde and phenol-formaldehyde compositions, are much more difficult to fabricate because they do not exist as plastic resins at temperatures much below their hardening temperatures. A heat hardenable composition can be shaped only while it is in a fused condition, and the failure of other hardenable compositions to reach a fused state below their hardening temperatures is a great handicap in fabricating operations. By the time a hardenable urea-formaldehyde or phenol-formaldehyde product has reached a fused state in a fabricating operation, its hardening already has begun, so that the hardening interferes with the shaping or molding of the composition.

Still other heat hardenable compositions, such as diallyl esters, have low melting points or are liquids at room temperature, but have the disadvantage that they do not attain a resinous state until after hardening has begun. Such compositions cannot be handled satisfactorily in the resinous state that they attain after hardening has begun because the hardening, once it has started, is very difficult to stop. Because of the difficulty of controlling the hardening of compositions such as diallyl esters once the hardening has reached the stage at which the compositions are resinous such compositions ordinarily are shaped only by the casting method, which is the sole method by which they can be handled in non-resinous liquid form.

A polymerizable polyester is resinous because it is a polymer. The resinous state of such a polyester makes it possible to employ the polyester in a molding operation either alone or in admixture with a filler. A non-resinous liquid composition, such as a diallyl ester, cannot be used in a molding operation because it would be squeezed out of the filler and squirted out of the mold.

A saturated heat hardenable polyester, such as glycerol phthalate, is hardened by esterification with elimination of water. A polyester that hardens by esterification cannot be employed to make a molded article or other solid body because it is too difficult to remove water from the interior of such a solid body in order to complete the hardening. Even urea-formaldehyde and phenolformaldehyde products tend to give off small amounts of volatiles as they are hardened in a mold. A polymerizable unsaturated polyester hardens by polymerization without evolution of volatiles.

The principal object of the invention is to provide polymerizable polyesters of improved stability that have high compressive strength upon polymerization. More specific objects and advantages are apparent from the description, which discloses and illustrates but is not intended to limit the scope of the invention.

A polymerizable polyester that is the product of the esterification reaction of ingredients consisting essentially of ethylene glycol and an ethylene alpha, beta-dicarboxylic acid is lacking in stability in that it tends to become hazy or to crystallize upon standing. A polymerizable polyester that becomes hazy upon standing is thereby rendered unmarketable.

A polymerizable polyester that is the product of the esterification reaction of ingredients consisting essentially of propylene glycol and an ethylene alpha, beta-dicarboxylic acid when polymerized forms compositions having substantially lower compressive strength than those from ethylene glycol and an ethylene alpha, beta-dicarboxylic acid.

The present invention is based upon the discovery of a polymerizable polyester of improved stability that has high compressive strength upon polymerization, comprising the product of the esterification reaction of ingredients consisting essentially of three mols of an ethylene alpha, beta-dicarboxylic acid, from about one to about two mols of ethylene glycol and from about one to about two mols of propylene glycol.

Although the substitution of propylene glycol for such a substantial proportion of the ethylene glycol in an ethylene glycol-ethylene alpha, beta-dicarboxylic acid polyester does not substantially impair the compressive strength obtainable upon polymerization, substitution of any other glycol for even a small proportion of the ethylene glycol does substantially impair the compressive strength. Thus the present polyester is unique in being stable on standing and yet having high compressive strength upon polymerization.

The polymerizable polyesters of the invention, having improved stability and high compressive strength, are produced by means of a reaction between a composition comprising an ethylene alpha, beta-dicarboxylic acid (i. e., maleic acid or fumaric acid) and an ethylene glycol-propylene glycol composition in which the molar ratio of ethylene glycol to propylene glycol is from about 1:2 to about 2:1. (As used herein, unless otherwise indicated, "maleic acid" includes maleic anhydride.) Usually, it is preferable that maleic acid, fumaric acid or a mixture of maleic acid and fumaric acid be reacted with a glycol composition in which the molar ratio of ethylene glycol to propylene glycol is approximately 2:1, maleic anhydride being the most desirable acid ingredient. The characteristics of the polymerizable polyesters of the invention can be varied by using another dicarboxylic acid in place of a minor portion of the maleic acid, fumaric acid or mixture of maleic acid and fumaric acid. The characteristics of the polymerizable polyesters also can be modified by using, in place of a minor portion of the ethylene glycol-propylene glycol composition, another dihydric alcohol.

In general, the reaction that takes place to form a polymerizable polyester of improved stability that has high compressive strength is between two OH groups, one of which is the hydroxy radical of an alcohol, and the other of which is in a carboxylic acid radical. It is usually desirable that about one hydroxy OH group be reacted per carboxylic OH group, and most desirable that about 1.05 hydroxy OH groups be reacted per carboxylic OH group. (Acid anhydrides are herein considered to have the same number of carboxylic OH groups per molecule as the corresponding acid.) It is usually desirable that the ratio of OH groups derived from maleic acid, fumaric acid, ethylene glycol and propylene glycol to total OH groups in the composition to be esterified be at least about 9:10. If substantially less than nine-tenths of the reacting OH groups are derived from maleic acid, fumaric acid, ethylene glycol and propylene glycol, the resulting polymerized polyester, although it may be stable, is found to have substantially reduced compressive strength. Ordinarily, it is preferable that the ratio of OH groups derived from maleic acid, fumaric acid, ethylene glycol and propylene glycol to total OH groups in the composition to be esterified be at least about 97:100, and most desirable that it be at least about 99:100. As is described herein, the reason for adding a material other than maleic acid, fumaric acid, ethylene glycol and propylene glycol is to modify the characteristics of the resulting polyester. This modification should be accomplished without sacrifice of the high compressive strength of the polymerized polyester compositions of the invention. It is for this reason that it is usually desirable that the ratio of hydroxy and carboxylic OH groups not derived from maleic and fumaric acid, ethylene glycol and propylene glycol be not more than about 1:100.

An equivalent amount of any dicarboxylic acid can be used in the practice of the invention, in place of part of the maleic acid or fumaric acid, and any glycol can be used in place of an equivalent amount of the ethylene glycol or propylene glycol. The amount of such modifying agents used should be within the range hereinbefore indicated. The glycols whose use as modifiers is usually preferred include dipropylene glycol, any butylene glycol, any polymethylene glycol in the series from trimethylene glycol to decylene glycol (e. g., decamethylene glycol), or any polyethylene glycol in the series from diethylene glycol to nonaethylene glycol; the acids whose use in place of maleic acid or fumaric acid is usually preferred include itaconic, citraconic or mesaconic acid, any normal acid in the series from oxalic and malonic to sebacic, any benzene dicarboxylic, naphthalene dicarboxylic or cyclohexane dicarboxylic acid, diglycolic, dilactic or resorcinol diacetic acid.

The method by which a composition comprising maleic acid or fumaric acid and the ethylene glycol-propylene glycol composition is esterified is demonstrated by the following procedure:

Maleic anhydride (1.00 gram mol), ethylene glycol (0.66 gram mol), propylene glycol (0.39 gram mol) and hydroquinone (0.07 gram) are mixed in a three-necked flask fitted with a thermometer, a condenser and an inlet tube attached to a carbon dioxide source. A moderate stream of carbon dioxide is bubbled into the reactants through the inlet tube, and this gas flow is continued throughout the rest of the reaction; the flask is then lowered into an oil bath and heated to about 220° C. (over a period of about two hours) and held at a temperature between about 220° C. and about 226° C. for an additional six hours. During the reaction the distillate may be analyzed, and sufficient amounts of the ingredients lost may be added to the flask from time to time to maintain the initial proportions of reacting ingredients. If the only addition is the ingredient lost in excess in an amount sufficient to maintain the initial proportions, the rate of removal of unreacted ingredients gradually decreases and substantially no unreacted ingredients may be left in the composition at the end of the reaction. The resulting polyester has an acid number of about 35; it may be cooled and combined with a polymerizable monomeric compound or a solvent as hereinafter described.

The esterification reaction which is believed to occur between maleic acid or fumaric acid and an ethylene glycol-propylene glycol composition is represented by Equation 1, below, which shows the reaction of three mols of maleic anhydride with one mol of propylene glycol and two mols of ethylene glycol (as used herein, "one mol of propylene glycol and two mols of ethylene glycol" refers to the molar ratio of ethylene glycol to propylene glycol in the glycol composition, and "reaction of three mols of maleic anhydride with one mol of propylene glycol and two mols of ethylene glycol" refers to the molar ratio of maleic anhydride to glycol composition).

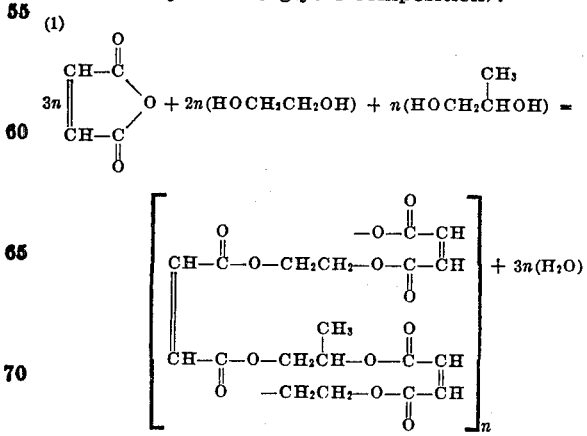

Use of a small amount of another glycol in place of an equivalent amount of the ethylene glycol or propylene glycol, or of a small amount of another dicarboxylic acid in place of an equivalent amount of maleic acid is thought to result in the production of a polyester having a molecular structure similar to that shown for the product of Equation 1, except that some glycol residues are from the other glycol, or some acid residues are from the other dicarboxylic acid. Fumaric acid can be used in place of the maleic acid, or a mixture (in any proportions) of maleic acid and fumaric acid can be used in place of the maleic acid.

The polymerizable polyesters of the invention are subjected to addition polymerization (to produce materials having high compressive strength) through their olefinic double bonds. This addition polymerization is believed to proceed according to Equation 2, below:

(2) 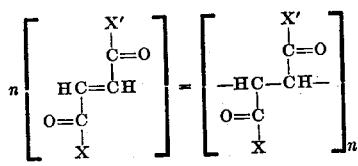

in which X and X' represent the remainder of the polyester molecule, i. e., in addition to the fumaric acid residue shown. Thus,

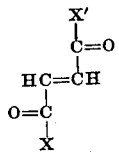

represents an entire polyester molecule, any residues from acids other than fumaric being included in the part of the molecule represented by X and X'.

It is usually desirable that polymerizable polyesters be polymerizable to infusible resins. For some uses of the polyester resins of the invention it is desirable that the polyester have a certain viscosity and, for other uses, that it have a different viscosity. Therefore, the extent to which the esterification is conducted (the value of $n$ in Equation 1, above, is a measure of the extent of esterification) is such as yields a polyester which has about the desired viscosity, and which polymerizes at about the desired rate. In some instances it may be desirable that the average value of $n$ in Equation 1 be as small as about 1, although it is usually preferable that it be at least about 3. In some instances it may be advantageous to conduct the esterification until the value of $n$ is as high as about 40, but it is ordinarily preferable that $n$ be not higher than about 5.

The esterification reaction can be expedited by use of an acid substance as an esterification catalyst. Any organic acid, inorganic acid or acid salt that is soluble in the reaction mixture may be employed as a catalyst, usually in an amount not less than about 0.005 per cent of the reactants and not more than 0.3 per cent of the reactants. (The terms "per cent" and "parts" as used herein to refer to quantities of material mean per cent and parts by weight, unless otherwise qualified.) It is usually desirable that any such acid substance be readily volatile or be of such a character that it has no deleterious effect in the final product. Hydrogen chloride gas is the most desirable catalytic agent, but the esterification reaction proceeds so readily that the use of an esterification catalyst usually is not warranted.

The preferred polymerizable polyesters of the invention are linear polyesters ("linear polyester," as used herein, means a polyester having very few cross linkages, as evidenced by solubility in such solvents as acetone). It is not possible to avoid all cross linking, ordinarily thought to result, at least to a small extent, from addition polymerization during the esterification reaction, so the polyesters are in fact only substantially linear.

In order to minimize cross linking, through addition polymerization during the esterification reaction, it is ordinarily necessary to conduct the esterification in the presence of a material that inhibits addition polymerization of olefinic double bonds. An antioxidant such as hydroquinone, pyrogallol, tannic acid or any aromatic amine, such as aniline or phenylene diamine, may be employed as an inhibitor, it usually being desirable to use not less than about 0.01 per cent of such inhibitor (based upon the combined weight of the glycol and dicarboxylic acid compositions), and preferable to use not less than about 0.02 per cent. It is ordinarily advisable to use not more than about 0.1 per cent of such an inhibitor and preferable to use not more than about 0.04 per cent.

The preparation of the unsaturated polyester preferably is carried out in an atmosphere of an inert gas such as carbon dioxide, nitrogen or the like, in order to prevent darkening or to make it possible to obtain a pale or colorless product. Bubbling the inert gas through the reacting ingredients is advantageous in that the gas serves the added functions of agitation and of expediting the removal of water formed by the reaction. Exclusion of oxygen is desirable not only because it causes discoloration, but also because it tends to produce premature polymerization at the elevated temperatures used.

The acid number of the product depends upon the degree of reaction and the proportions of acid and alcohol used for the reaction. With approximately equimolecular proportions of dibasic acid and dihydric alcohol, the reaction may be carried to an acid number of about 35. The use of an acid catalyst may make it possible to attain a lower acid number without substantial polymerization. It is ordinarily preferable that the acid number be not less than about 30 and not more than about 40.

Although the haziness that develops in polyesters that are essentially ethylene glycol esters of an ethylene alpha, beta-dicarboxylic acid tends to appear if they are maintained in their unpolymerized form for an extended period of time, it has been found that this haziness appears after a much shorter period of time when these polyesters are dissolved in another substance. This second substance may be merely a solvent, such as glycol-monomethyl ether, glycol-monoethyl ether or glycol-monobutyl ether, or it may be a polymerizable monomeric compound. The polymerizable monomeric compound is one with which the polyester is compatible in the proportions in which it is desired to mix the two materials. Examples of polymerizable monomeric compounds include diallyl phthalate, diallyl oxalate, diallyl diglycolate, triallyl citrate, carbonyl bis-(allyl lactate), maleyl bis-(allyl lactate), fumaryl bis-(allyl lactate), succinyl bis-(allyl lactate), adipyl bis-(allyl lactate), sebacyl bis- (allyl lactate), phthalyl bis-(allyl lactate), fumaryl bis-(allyl glycolate), carbonyl bis-(allyl glycolate), carbonyl bis-(allyl silicylate), tetra-(allyl glycolate) silicate, and tetra-(allyl lactate) silicate.

The preferred polymerizable monomeric compounds are diallyl phthalate, carbonyl bis-(allyl lactate) and diallyl diglycolate.

It is usually desirable that the polyester solution contain at least about 5 per cent of the polymerizable monomeric compound (or other solvent), or not more than about 95 per cent of the polymerizable polyester. It is ordinarily preferable that such a solution contain at least about 15 per cent of the polymerizable monomeric compound, or not more than about 85 per cent of the polymerizable polyester. It is usually not desirable that the solution contain more than about 40 per cent of the polymerizable monomeric compound, and preferred that it contain not more than about 30 per cent of the polymerizable monomeric compound.

Other polymerizable substances may be used (with the polyester) to produce such a solution. The polymerizable substances that can be used are those which are compatible with the polyester, for example, styrene, vinyl acetate, methyl methacrylate and methyl acrylate.

The polymerizable polyesters of the invention are miscible with styrene to a substantial extent, considerably more so, for example, than are ethylene glycol maleates. This unexpectedly high miscibility of the polyesters of the invention with styrene is particularly advantageous in that it makes possible a large variety of copolymers of styrene with the polyesters of the invention.

The tendency of a polymerizable polyester to become hazy can be determined by means of an accelerated test. It is found that a solution of the polymerizable polyester in a solvent such as a glycol-monoalkyl ether becomes hazy much sooner than does a solution in a polymerizable monomeric compound. This test is advantageous in that it permits a quick evaluation of the stability of a particular polyester composition.

It is frequently desirable to modify the characteristics of the resins of the invention by mixing a filler or a polymerization catalyst with them. The filler may be any granular mineral filler such as silica, mica, china clay or bentonite; a mineral fiber filler such as glass fibers or Canadian asbestos; or a cellulosic filler such as alpha cellulose, wood flour, wood pulp, saw dust, wood shavings or walnut shell flour; or a mixture of such fillers. Although in some instances it may be desirable to use a composition of the invention without a filler, it is usually economically preferable to incorporate a filler in the composition because satisfactory results can be attained with the less expensive filler-resin compositions. In some instances, to prepare an adhesive composition, it may be practical to use a ratio of filler to resin as high as about 1:4, although it is usually preferable to use a ratio not higher than about 1:5. It is usually advantageous to use enough filler so that the ratio of filler to resin is at least about 1:100, and ordinarily preferable to use enough filler so that the ratio is at least about 1:30.

It may be advantageous, in preparing a molding composition, to use a ratio of filler to resin as high as about 9:1, although it is usually preferable to use a ratio not higher than about 3:1. Best results are usually obtained when the ratio is not higher than about 6:4. It is usually desirable to use a ratio of filler to resin of at least about 1:99, and ordinarily preferable to use a ratio of at least about 4:6. Most desirably the ratio of filler to resin is not less than about 55:45.

The rate of the addition polymerization is faster in the presence of polymerization catalysts. Peroxide type polymerization catalysts can be used, including benzoyl peroxide, succinyl peroxide, tert-butyl perbenzoate, di-tert-butyl perphthalate, acetyl peroxide, peracetic acid, perbenzoic acid, toluyl peroxide, p-bromobenzoyl peroxide, anisoyl peroxide, chloroacetyl peroxide, acetyl benzoyl peroxide, diacetyl peroxide, and furoyl peroxide. Certain organic ozonides also increase the rate at which addition polymerization of olefinic double bonds takes place; examples of organic ozonide polymerization catalysts include di-isopropyl ozonide and di-isobutylene ozonide. Organic hydroperoxide polymerization catalysts can also be used; examples of such polymerization catalysts include tetralin hydroperoxide, 1-hydroxy-cyclopentyl-hydroperoxide-1, 1 - hydroxy - cyclohexyl - hydroperoxide-1, 1-hydroxy-cycloheptyl-hydroperoxide-1, 1-hydroxy-cyclooctyl-hydroperoxide-1 and tertiary-butyl-hydroperoxide, and mixtures of organic hydroperoxides, such as a commercial mixture of hydroperoxides having an average molecular weight of 130 and having the general formula R—O—O—H in which R is a hydrocarbon radical (Uniperox 60).

Although any amount of a catalyst sufficient to cause the polymerization to proceed at a reasonable rate can be used in carrying out the polymerization reaction, the usual "catalytic amounts" are normally employed. For example, it is ordinarily advantageous to use an amount of a polymerization catalyst that is at least about 0.05 per cent of the composition to be polymerized. It is usually preferable that the amount of catalyst used be at least about 0.1 per cent of the composition, to be polymerized. Ordinarily, it is advisable that the amount of catalyst used be not more than about 5 per cent of the composition to be polymerized, and most desirable that the amount of catalyst be not more than about 3 per cent.

When a polymerizable monomeric compound is used with the polyester it is frequently desirable to dissolve the polymerization catalyst in the polymerizable monomeric compound and then mix the polyester with the resulting solution. This procedure is advantageous because the polymerizable monomeric compound usually has a viscosity substantially lower than that of the polyester so that it is considerably easier to effect solution. In certain other instances it may be desirable to disperse the polymerization catalyst in the filler, e. g., by grinding the catalyst with the filler in a ball mill, before the filler is mixed with the polyester. In some cases a fibrous filler may be mixed with a solution of the polymerization catalyst in a volatile solvent, and the filler dried before it is mixed with the polyester. Plasticizers, lubricants, pigments or other coloring matter may be incorporated in the composition if desired.

EXAMPLE 1

A polymerizable polyester of improved stability that can be polymerized to yield a product of high compressive strength is prepared according to the following procedure:

Maleic anhydride (1.00 gram mol), ethylene glycol (0.66 gram mol), propylene glycol (0.39 gram mol) and hydroquinone (0.07 gram) are mixed in a three-necked flask fitted with a thermometer, a condenser and an inlet tube attached to a carbon dioxide source. A moderate stream of carbon dioxide is bubbled into the reactants through the inlet tube, and this gas flow is continued throughout the rest of the reaction; the flask is then lowered into an oil bath and heated to about 220° C. (over a period of about two hours) and held at a temperature between about 220° C. and about 226° C. for an additional six hours. During the reaction the distillate may be analyzed, and sufficient amounts of the ingredients lost may be added to the flask from time to time to maintain the initial proportions of reacting ingredients. If the only addition is the ingredient lost in excess in an amount sufficient to maintain the initial proportions, the rate of removal of unreacted ingredients gradually decreases and substantially no unreacted ingredients may be left in the composition at the end of the reaction. The resulting polyester has an acid number of about 35.

This polyester is cooled to about 140° F., and is dissolved in diallyl phthalate to form a composition (hereinafter called sample (f)) that is 20 per cent diallyl phthalate and 80 per cent polyester. The solution is found to be stable (i. e., does not become hazy upon standing). Likewise, a 50 per cent solution of the polyester in glycol-monomethyl ether is found to be stable.

By way of comparison, the procedure of the first paragraph of the example is repeated using, instead of the mixture of 0.66 gram mol of ethylene glycol and 0.39 gram mol of propylene glycol, (a) 1.05 gram mols of ethylene glycol, (b) 1.05 gram mols of a glycol composition that is 90 mol per cent ethylene glycol and 10 mol per cent propylene glycol, and (c) 1.05 gram mols of a glycol composition that is 80 mol per cent ethylene glycol and 20 mol per cent propylene glycol. In each case, it is found that a 50 per cent solution of the polyester in glycol-monomethyl ether shows signs of crystallization within one week.

Fumaric acid can be used with similar results in place of the maleic anhydride, in the preparations shown in this and the succeeding examples.

EXAMPLE 2

The procedure of the first paragraph of Example 1 is repeated, using 0.52 gram mol of ethylene glycol and 0.52 gram mol of propylene glycol, and the resulting polyester is dissolved in diallyl phthalate (to form a solution that is hereinafter called sample (d) as described in the second paragraph of Example 1). The solution is found to be stable.

EXAMPLE 3

Polyester molding compositions are prepared according to the following procedure:

A sample of a polyester solution in diallyl phthalate (108 grams of the polyester prepared as described in the first paragraph of Example 1, dissolved in 27 grams of diallyl phthalate, as described in the second paragraph of Example 1) is mixed for about 30 minutes in a small Banbury mixer (the mixer has a capacity between about 200 and about 400 cc.) with plastic grade asbestos (165 grams), cobalt naphthenate (an amount such that the cobalt added is 0.012 per cent of the polyester solution) and benzoyl peroxide (5.4 grams of a paste catalyst that is 50 per cent benzoyl peroxide and 50 per cent tri-cresyl phosphate). The resulting putty-like molding compound is used to mold bars (6" x ½" x ¼") at a mold temperature of about 210° F. in a twenty-nine ton (2-cavity mold) hydraulic press, using a cure time of 40 minutes. Disks (about 2 inches in diameter and about 0.06 inch thick) are also molded at a mold temperature of about 300° F. in a thirty-ton (2-cavity mold) hydraulic press, using a cure time of about one minute.

The procedure of the preceding paragraph is repeated to prepare molding compositions (and moldings from these compositions) from polyesters (a), (b) and (c) prepared as described in the third paragraph of Example 1 dissolved in diallyl phthalate to form solutions that are 80 per cent polyester and 20 per cent diallyl phthalate, from polyester solution (d) and from a polyester solution in diallyl phthalate prepared as described in the first and second paragraphs of Example 1, using 1.05 gram mols of propylene glycol instead of the ethylene glycol-propylene glycol composition (hereinafter called sample (e)).

The moldings prepared as described in the preceding paragraphs of the example are tested for compressive strength, water absorption and Barcol hardness, and the results are presented in Table 1, below. "Compressive strength," as reported in Table 1, is determined using a section of a bar molding (hereinbefore described) 1¼ inches long. The sample is placed so that the 1¼ inch dimension is the height, and a rate of advance of 0.05 inch per minute is used. The figure entered in Table 1 is the compressive strength in pounds per square inch. "Water absorption" is determined by weighing a two-inch disk (hereinbefore described), immersing it in water (at a temperature of about 25° C.) for about one week, and determining the increase in weight. The increase in weight in grams is reported in Table 1 as the water absorption. A standard "Barcol hardness" tester is employed and hardness is read from a dial gauge which gives hardness readings as compared to an arbitrary standard. Barcol hardness is determined on samples of the bars at about 25° C. and at about 115° C.

*Table 1*

| Sample | Compressive Strength | Water Absorption | Barcol Hardness | |
| --- | --- | --- | --- | --- |
| | | | 25° C. | 115° C. |
| (a) | 37,300 | 0.250 | 74 | 65 |
| (b) | | 0.227 | 72 | 68 |
| (c) | 35,000 | 0.232 | 70 | 70 |
| (d) | 34,900 | 0.198 | 71 | 68 |
| (e) | 28,600 | 0.244 | 70 | 63 |
| (f) | 36,700 | 0.246 | 68 | 68 |

EXAMPLE 4

Sheet castings are prepared from samples (a) and (c) dissolved in diallyl phthalate to form solutions that are 80 per cent polyester and 20 per cent diallyl phthalate, and from samples (d), (e) and (f). Each polyester solution (25 grams) is mixed with benzoyl peroxide (1 gram of a paste catalyst that is 50 per cent benzoyl peroxide and 50 per cent tri-cresyl phosphate) and cobalt naphthenate (an amount such that the cobalt added is 0.012 per cent of the polyester solution), and is cast between two sheets of cellophane-covered glass. The castings are cured by heating (about 24 hours at 25° C.; about 30 hours at 50° C.; and about 16 hours at 75° C.). A 1" x 3" sample of the casting (which is about 0.15 inch thick) is cut from each cured sheet, weighed and tested for water absorption by immersion in water (at a temperature of about 25° C.) for about 24 hours. The increase is weight in grams after this immersion is reported in Table 2 as water absorption.

*Table 2*

| Sample | Water Absorption |
|---|---|
| (a) | 0.21 |
| (c) | 0.23 |
| (d) | 0.22 |
| (e) | 0.21 |
| (f) | 0.21 |

Having described the invention, I claim:

1. A linear unsaturated polyester of improved stability which is capable of hardening by addition polymerization to a body having high compressive strength and which is the product of the esterification reaction, without substantial addition polymerization, of ingredients consisting essentially of three mols of an unsubstituted butenedioic acid, from one to two mols of ethylene glycol and from one to two mols of propylene glycol.

2. A linear unsaturated polyester of improved stability which is capable of hardening by addition polymerization to a body having high compressive strength and which is the product of the esterification reaction, without substantial addition polymerization, of ingredients consisting essentially of three mols of an unsubstituted butenedioic acid, two mols of ethylene glycol and one mol of propylene glycol.

3. A product of the polymerization of a composition comprising a polymerizable ployester claimed in claim 1.

4. A product of the polymerization of a composition comprising a polymerizable polyester claimed in claim 2.

5. A polymerizable polyester as claimed in claim 1 in which the acid is maleic anhydride.

6. A product of the polymerization of a composition comprising a polymerizable polyester claimed in claim 5.

7. A polymerizable polyester as claimed in claim 2 in which the acid is maleic anhydride.

8. A product of the polymerization of a composition comprising a polymerizable polyester claimed in claim 7.

HAROLD A. HOPPENS.

REFERENCES CITED

The following references are of record in the file of this patent:

UNITED STATES PATENTS

| Number | Name | Date |
|---|---|---|
| 2,089,196 | Ellis | Aug. 10, 1937 |